(12) United States Patent
Zeh

(10) Patent No.: US 12,253,455 B2
(45) Date of Patent: Mar. 18, 2025

(54) DEVICE FOR OPTICALLY IDENTIFYING SURFACES

(71) Applicant: 4Art Holding AG, Steinhausen (CH)

(72) Inventor: Kai Zeh, Munich (DE)

(73) Assignee: 4Art Holding AG, Steinhausen (CH)

( * ) Notice: Subject to any disclaimer, the term of this patent is extended or adjusted under 35 U.S.C. 154(b) by 179 days.

(21) Appl. No.: 17/913,514

(22) PCT Filed: Mar. 3, 2021

(86) PCT No.: PCT/IB2021/051755
§ 371 (c)(1),
(2) Date: Sep. 22, 2022

(87) PCT Pub. No.: WO2021/191709
PCT Pub. Date: Sep. 30, 2021

(65) Prior Publication Data
US 2023/0105753 A1 Apr. 6, 2023

(30) Foreign Application Priority Data

Mar. 23, 2020 (CH) .................................. 00345/20

(51) Int. Cl.
*G01N 21/01* (2006.01)
*F21S 4/20* (2016.01)
(Continued)

(52) U.S. Cl.
CPC ................ *G01N 21/01* (2013.01); *F21S 4/20* (2016.01); *F21V 5/04* (2013.01); *F21V 33/00* (2013.01);
(Continued)

(58) Field of Classification Search
CPC ........... G01N 21/01; G01N 2021/0106; G01N 2021/0181; G01N 2201/0221;
(Continued)

(56) References Cited

U.S. PATENT DOCUMENTS 4,924,086 A 5/1990 Weber
5,094,525 A * 3/1992 Nelson, Jr. ............. G02B 27/08
353/1

(Continued)

FOREIGN PATENT DOCUMENTS

CN 104866837 B 8/2015
CN 105740820 B 7/2016
(Continued)

OTHER PUBLICATIONS

International Search Report and Written Opinion issued for PCT/IB2021/051752, dated May 7, 2021.
(Continued)

*Primary Examiner* — Mohamed K Amara
(74) *Attorney, Agent, or Firm* — Fleit Intellectual Property Law; Paul D. Bianco; Stephen Bongini

(57) ABSTRACT

A device for optically identifying surfaces, in particular for optically identifying structured and/or pictorial surfaces, spaces and/or e.g. paintings or sculptures is simple to use independently of the location. For this purpose, the device includes a housing in which light-emitting and light-receiving elements are arranged, and the device also includes a first portion having at least one lens, a portion that follows the first portion in the longitudinal direction and has a screen, and an adjoining handle portion.

20 Claims, 1 Drawing Sheet

(51) Int. Cl.
*F21V 5/04* (2006.01)
*F21V 33/00* (2006.01)

(52) U.S. Cl.
CPC .............. *G01N 2021/0106* (2013.01); *G01N 2021/0181* (2013.01); *G01N 2201/0221* (2013.01)

(58) Field of Classification Search
CPC ..... G01N 2021/4709; G01N 2201/062; G01N 2201/0639; G01N 21/474; G01N 21/95607; G01N 2021/95615; F21S 4/20; F21V 5/04; F21V 33/00; G06V 10/12; G06V 30/142
See application file for complete search history.

(56) References Cited

U.S. PATENT DOCUMENTS

| | | | |
|---|---|---|---|
| 5,673,338 A | 9/1997 | Denenberg | |
| 7,531,349 B1* | 5/2009 | Shepard | G01N 21/6402 250/462.1 |
| 10,194,091 B2 | 1/2019 | Nashizawa | |
| 10,891,485 B2 | 1/2021 | Anorga | |
| 10,990,845 B2 | 4/2021 | Boutant | |
| 11,099,134 B2 | 8/2021 | Prapenka | |
| 11,219,359 B2* | 1/2022 | Huang | A61B 1/00066 |
| 11,318,323 B2* | 5/2022 | Hetz | A61N 5/067 |
| 11,448,598 B1* | 9/2022 | Bhartia | G01N 21/359 |
| 11,793,397 B2* | 10/2023 | Banerjee | A61B 1/00009 |
| 2003/0098422 A1* | 5/2003 | Silcott | G01N 15/0205 250/458.1 |
| 2003/0160182 A1* | 8/2003 | Petrich | G01N 21/6447 250/461.1 |
| 2004/0080661 A1 | 4/2004 | Afsenius | |
| 2004/0124359 A1 | 7/2004 | Hamrelius et al. | |
| 2005/0168834 A1* | 8/2005 | Matsumoto | H04N 23/51 348/E5.025 |
| 2005/0207943 A1* | 9/2005 | Puzey | C12Q 1/04 422/82.05 |
| 2008/0266549 A1* | 10/2008 | Schiedemeyer | G01N 21/359 356/73 |
| 2009/0101842 A1 | 4/2009 | Shepard | |
| 2010/0140476 A1* | 6/2010 | Werner | G01J 3/0264 250/339.08 |
| 2011/0044713 A1* | 2/2011 | Masuda | G03G 15/0131 356/614 |
| 2011/0102577 A1 | 5/2011 | Prakapenka | |
| 2011/0240886 A1* | 10/2011 | Tokhtuev | G01J 1/0411 250/573 |
| 2014/0140087 A1* | 5/2014 | Scholtz | G02B 6/0005 362/554 |
| 2014/0221846 A1* | 8/2014 | Bambot | A61B 5/0075 600/476 |
| 2016/0178528 A1* | 6/2016 | Weimer | G01N 21/94 356/237.2 |
| 2016/0231253 A1* | 8/2016 | Nygaard | B07C 5/342 |
| 2017/0038301 A1* | 2/2017 | Flanagan | G01N 21/6486 |
| 2018/0059015 A1* | 3/2018 | Li | G01N 33/04 |
| 2018/0350052 A1 | 12/2018 | Julkunen | |
| 2019/0353590 A1 | 11/2019 | Ribes Cortes et al. | |
| 2020/0134773 A1* | 4/2020 | Pinter | G01N 21/8806 |
| 2021/0109014 A1* | 4/2021 | Heffels | G01N 21/61 |
| 2022/0008068 A1* | 1/2022 | Vyas | A61B 1/018 |
| 2023/0105753 A1* | 4/2023 | Zeh | F21V 5/04 356/432 |
| 2023/0147881 A1 | 5/2023 | Zeh | |
| 2023/0206637 A1 | 6/2023 | Zeh | |
| 2023/0243820 A1* | 8/2023 | Karunen | G01N 21/8483 436/164 |

FOREIGN PATENT DOCUMENTS

| | | |
|---|---|---|
| CN | 108898597 A | 11/2018 |
| DE | 3737631 C1 | 3/1989 |
| DE | 10 2008 018586 A1 | 11/2009 |
| DE | 10 2014 018940 A1 | 6/2016 |
| DE | 10 2016 011497 B4 | 3/2018 |
| DE | 10 2017 000296 B4 | 7/2018 |
| EP | 1381035 A2 | 1/2004 |
| WO | 2012/087754 A1 | 6/2012 |
| WO | 2017/089736 A1 | 6/2017 |
| WO | 2017/198950 A1 | 11/2017 |
| WO | 2018/130693 A1 | 7/2018 |
| WO | 2018/212809 A1 | 11/2018 |
| WO | 2021/191707 A1 | 9/2021 |
| WO | 2021/191708 A1 | 9/2021 |

OTHER PUBLICATIONS

International Search Report and Written Opinion issued for PCT/IB2021/051754, dated May 7, 2021.
International Search Report and Written Opinion issued for PCT/IB2021/051755, dated May 7, 2021.
Labati, Two-view contactless fingerprint acquisition system: A case study for clay artworks, Biometric measurements and systems for security and medical applications, Sep. 14, 2012, IEEE Workshop, pp. 1-8.
For U.S. Appl. No. 17/913,497: Office Action dated May 24, 2024.
Office Action for EP 21 711 040.2—dated May 6, 2024.
Office Action for EP 21 710 597.2 dated May 8, 2024.
Office Action for EP 21 710 598.0 dated May 6, 2024.

* cited by examiner

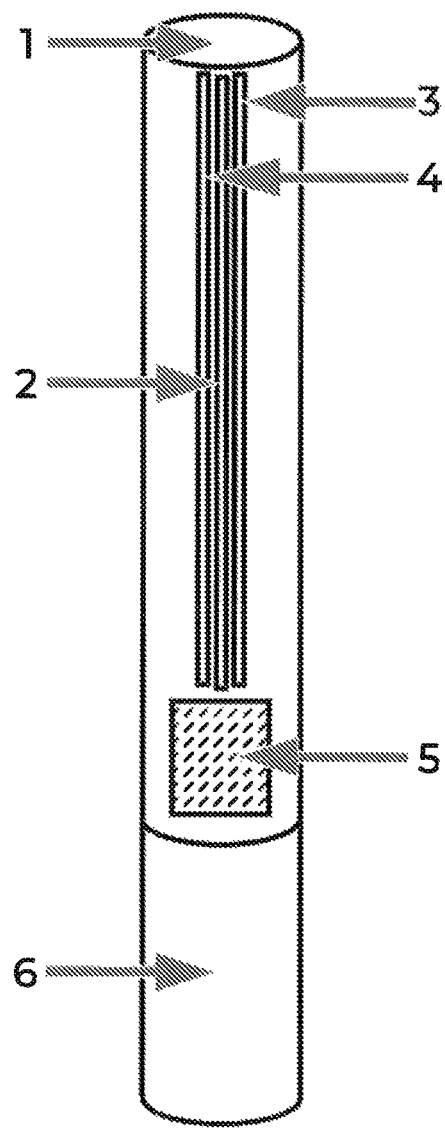

DEVICE FOR OPTICALLY IDENTIFYING SURFACES

FIELD OF THE INVENTION

The invention relates to a device for optically identifying surfaces, in particular, for optically identifying structured and/or pictorial surfaces, spaces and/or, for example, those of paintings or sculptures.

BACKGROUND

A stationary optical scanning device for flat surfaces is disclosed in the DE 3737631 C1. It comprises a laser light source, a light deflection device impinged by the laser light beam, an imaging element, an imaging retroreflector and a light-receiving device. It is used for detecting errors on reflective surfaces, wherein fluttering of the surface should not impair measurements.

Another stationary optical device for assessing the surfaces of a component is described in DE 102008018586 A1. Two light sources and a camera device are provided, wherein the camera receives the light beams of the light sources reflected on the surfaces of the component to generate an image of the surfaces.

A similar optical analysis device for detecting the characteristics of rectangular semiconductors is shown by DE 102016011497 B4.

An optical scanning device for recording and reproducing information using light beams with at least three wavelengths, an optical pickup device, is shown by EP 1381035 B1.

A stationary measuring system for surface assessment and hyperspectral imaging is described in DE 1 02017000296 A1. A illumination pattern of a first measuring light with a plurality of wavelengths is generated and the illumination pattern is imaged on the surface to be examined so that it can be sharply imaged by a chromatic lens at different distances. The intensity distribution of the split first measuring light is detected by means of a detector and topographical characteristics of the surface to be examined are determined from this. The surface is also homogeneously illuminated with a second measuring light. A multifocal chromatically encoded 3D measurement method is combined with a non-confocal second measuring light. The structure and composition of the surfaces should be quickly and accurately determinable.

In DE 102014018940 A1, a method for assessing paint or varnish surfaces using a lamp is disclosed. The lamp, an LED or halogen lamp, should be able to produce a light spectrum that is similar to daylight and can be controlled or regulated. In particular, it should be possible to switch between daylight and the more suitable colour spectrum for assessing the surface. The lamp can be designed as a hand lamp.

SUMMARY

One aspect of the invention is providing a device for optically identifying surfaces, which is simple to use independently of location and safe.

Such a device is disclosed herein.

The device according to the invention comprises a housing in which light-emitting and light-receiving elements are arranged, wherein it is shaped in a rod shape and has a first area with at least one lens, an area following in the longitudinal direction with a screen and a subsequent grip area.

Preferred embodiments of the invention are disclosed in the dependent claims.

The device according to the invention is a portable handheld device but can also be designed as a stand-alone device and is used in particular for the detection of the surface structures of art objects (e.g., paintings or sculptures).

BRIEF DESCRIPTION OF THE DRAWING

The invention is described in more detail below in an exemplary embodiment based on a drawing.

DETAILED DESCRIPTION

In the drawing, the only FIGURE shows a device 1 according to the invention for optically identifying surfaces in an embodiment. The device 1 comprises a housing, which in the example is rod-shaped and with a cylindrical cross-section. It comprises three areas. A first area with a rod-shaped lens 2, a longitudinal area following the in the longitudinal direction with a screen 5, a subsequent grip area 6.

The device 1 is held with one hand in the grip area 6, which can also be provided with a surface that improves the grip.

The lens 1 is in the example rod-shaped and extends from a end face of the device 1 to the screen 5. In an embodiment not shown, round lenses may also be arranged.

Parallel to the lens 2 are arranged to the right and left of these light sources 3, 4, in the example LED light sources.

The lens 2 focuses the light waves emitted by the light sources 3,4 and reflected from a surface to be analysed by means of photoreceptors (not shown) arranged inside the device 1.

The received light information is then combined by the logical combination of the environmental sensory data to form contiguous surface structures, which are then forwarded to a control unit connected to the device for further processing. Depending on the method and the required computing power, this processing step of the logical combination of the data of the photoreceptors with the environmental sensory data can be carried out on an external control unit connected to the device.

The screen 5 is equipped with display and operating elements and advantageously designed as a touch screen. The screen 5 is equipped with an autonomous computer unit, which is also arranged inside the device 1. The computer unit has connections for maintenance and synchronization of the device 1.

The device 1 can furthermore be equipped with sensors (not shown):
  Laser sensors for distance measurements
  Ultrasound sensors for environmental detection and distance measurements
  Gyroscope sensors for detecting rotational movements in three axes to determine the position and orientation of the device 1.

The device 1 also comprises communication modules, which can also be optional:
  Bluetooth module
  WLAN network module
  Module for satellite positioning (e.g., GPS, Galileo, GLONASS, Beidou).

The power supply of the device 1 is carried out by means of a rechargeable battery arranged in the hand area 6.

LIST OF REFERENCE NUMBERS 1 device
2 lens
3 light source
4 light source
5 screen
6 grip area

The invention claimed is:

1. A device for optically identifying surfaces, the device comprising:
   a housing in which light-emitting and light-receiving elements are arranged,
   wherein the housing is rod-shaped and extends along a longitudinal axis,
   the housing includes a first area with at least one lens, an area following in a longitudinal direction with a screen, and a subsequent grip area, and
   the lens extends in the longitudinal direction and is arranged on an outer surface of the housing.

2. The device according to claim 1, wherein the device is formed as a portable handheld device.

3. The device according to claim 2, wherein the at least one lens is rod-shaped or round.

4. The device according to claim 3, wherein the light-emitting elements comprise at least one light source extending parallel to the lens.

5. The device according to claim 4, wherein the device further includes:
   a computer unit; and
   at least one sensor and/or at least one communication module.

6. The device according to claim 2, wherein the light-emitting elements comprise at least one light source extending parallel to the lens.

7. The device according to claim 1, wherein the at least one lens is rod-shaped and extends along the outer surface from an end face of the housing to the area with the screen, the end face extending perpendicular to the longitudinal axis.

8. The device according to claim 7, wherein the light-emitting elements comprise at least one light source extending parallel to the lens.

9. The device according to claim 1, wherein the light-emitting elements comprise at least one light source extending parallel to the lens such that the device is not configured to emit light in a direction parallel to the longitudinal axis.

10. The device according to claim 1, wherein the device further includes:
    a computer unit;
    at least one sensor;
    at least one communication module.

11. The device according to claim 1, wherein the at least one lens is round.

12. The device according to claim 1, wherein the light-emitting elements are also arranged on the outer surface of the housing.

13. The device according to claim 1, wherein the light-emitting elements comprise at least one light source extending parallel to the lens on the outer surface of the housing.

14. The device according to claim 1, wherein the device further includes:
    a computer unit; and
    at least one sensor configured for distance measurement and/or configured for detecting rotational movement.

15. The device according to claim 1, wherein the device further includes a computer unit configured for optically identifying surface structures of a painting or sculpture based on light waves emitted by the light-emitting elements and reflected from the surface of the painting or sculpture.

16. The device according to claim 1, wherein the outer surface extends parallel to the longitudinal axis and completely surrounds the longitudinal axis in the circumferential direction.

17. The device according to claim 1, wherein the lens is not arranged on an end face of the housing that extends perpendicular to the longitudinal axis.

18. A device for optically identifying surface structures, the device comprising:
    a rod-shaped housing that extends along a longitudinal axis; and
    light-emitting and light-receiving elements,
    wherein a first area on an outer surface of the housing includes at least one lens that extends in the longitudinal direction,
    a second area on the outer surface of the housing, which follows the first area in a longitudinal direction, includes a screen, and
    a third area on the outer surface of the housing includes a grip area.

19. The device according to claim 18, wherein the first area on the outer surface of the housing also includes the light-emitting elements.

20. The device according to claim 18, wherein the light-emitting elements comprise at least one light source extending parallel to the lens in the first area on the outer surface of the housing.

* * * * *